(12) United States Patent
Aoyama et al.

(10) Patent No.: US 7,398,185 B2
(45) Date of Patent: Jul. 8, 2008

(54) ACTION RECORD SUPPORT PROGRAM, SYSTEM, DEVICE, AND METHOD

(75) Inventors: Kouji Aoyama, Kawasaki (JP); Akihiko Obata, Kawasaki (JP); Hiroaki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 11/423,980

(22) Filed: Jun. 14, 2006

(65) Prior Publication Data
US 2007/0219752 A1     Sep. 20, 2007

(30) Foreign Application Priority Data
Mar. 20, 2006     (JP)     ............................. 2006-077691

(51) Int. Cl.
*G06F 7/04*     (2006.01)
(52) U.S. Cl. .................... 702/183; 702/127; 702/182; 702/187; 702/189; 710/11; 710/14; 710/15; 710/16; 709/300; 714/37; 726/4; 726/34; 705/1; 705/10; 705/14; 705/8; 705/9
(58) Field of Classification Search ............... 702/127, 702/182, 187, 189, 183; 705/1, 8, 9, 10, 705/14; 709/300, 201, 219, 103, 217; 718/103; 714/37; 710/260, 11, 14, 15, 16; 726/22, 726/4, 34, 26, 27, 28
See application file for complete search history.

(56) References Cited

U.S. PATENT DOCUMENTS

| | | | | |
|---|---|---|---|---|
| 4,805,222 A | * | 2/1989 | Young et al. ................. | 382/115 |
| 5,471,616 A | * | 11/1995 | Johnson et al. ............... | 726/34 |
| 5,555,376 A | * | 9/1996 | Theimer et al. ............. | 709/229 |
| 6,604,124 B1 | * | 8/2003 | Archbold ..................... | 718/103 |
| 6,757,833 B2 | * | 6/2004 | Wakai et al. ................... | 726/4 |
| 7,031,998 B2 | * | 4/2006 | Archbold ..................... | 709/201 |
| 2004/0243832 A1 | * | 12/2004 | Wilf et al. ................... | 713/200 |
| 2005/0013426 A1 | * | 1/2005 | Ooki ..................... | 379/211.02 |
| 2007/0124288 A1 | * | 5/2007 | Swanson et al. ............... | 707/3 |

FOREIGN PATENT DOCUMENTS

| | | |
|---|---|---|
| JP | 10-111877 | 4/1998 |
| JP | 10-268959 | 10/1998 |
| JP | 11-143935 | 5/1999 |
| JP | 2002-189656 | 7/2002 |
| JP | 2002-352064 | 12/2002 |

* cited by examiner

*Primary Examiner*—Carol S Tsai
(74) *Attorney, Agent, or Firm*—Staas & Halsey LLP

(57) ABSTRACT

A system recognizes an occurrence of offline action when a state in which a person-to-be-recorded does not perform a computer operation continues for or longer than a predetermined time. Then, action related information such as action schedule information about a person-to-be-recorded, movement position information indicating the position of a person-to-be-recorded, immobile target position information indicating the position of an immobile target such as a building, a point on a map, etc., position-action correspondence associating the immobile target position information with the content of offline action, etc. is acquired. According to the information, the content of the offline action is estimated. When a next computer operation is detected, the estimated content is displayed for confirmation by the person-to-be-recorded. The system accepts and records the input of supplement, amend, approve, etc. from the person-to-be-recorded.

12 Claims, 14 Drawing Sheets

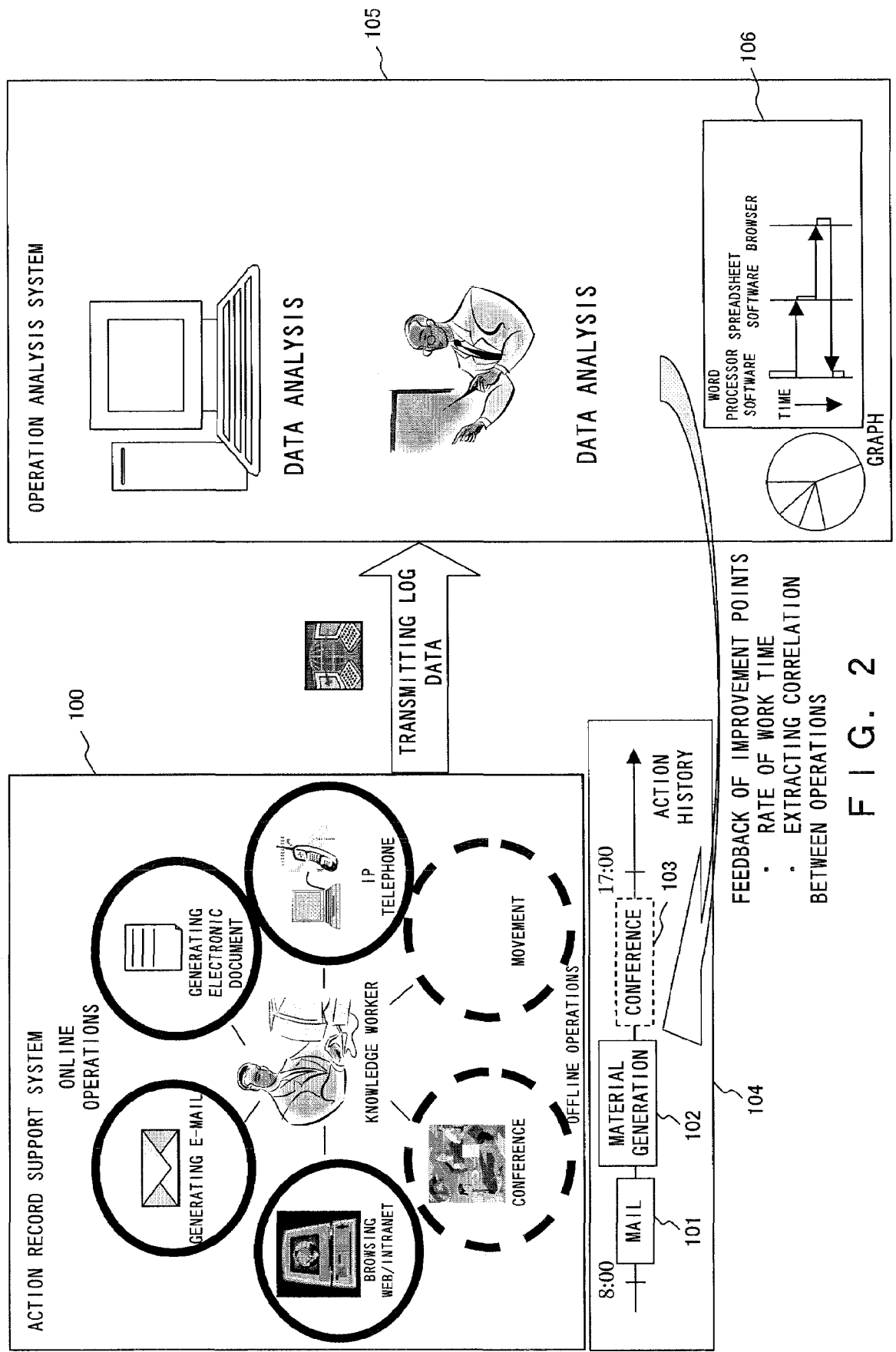
F I G. 2

| DATE | TIME | OPERATION SCHEDULE | PLACE |
|---|---|---|---|
| 2006/12/01 | 10:00~12:00 | ×× MEETING | CONFERENCE ROOM A |
| 2006/12/02 | 13:00~14:30 | ○○ MEETING | CONFERENCE ROOM B |

F I G. 5

| No. | START TIME | STOP TIME | WORK TIME | OUTLINE OF OPERATION | PLACE |
|---|---|---|---|---|---|
| 1 | 9:00 | 9:30 | 30 MINUTES | BROWSING WEB USING BROWSER | |
| 2 | 9:30 | 9:40 | 10 MINUTES | IP TELEPHONE | |
| 3 | 9:40 | 9:55 | 20 MINUTES | OPERATING SPREADSHEET SOFTWARE | |
| 4 | 10:00 | 12:00 | 120 MINUTES | CONFERENCE | CONFERENCE ROOM A |

OFFLINE ACTION HISTORY IS RECORDED.

FIG. 7

| LONGITUDE | LATITUDE | PLACE |
|---|---|---|
| X1 | Y1 | ○× STATION |
| X2 | Y2 | ○○ BUILDING |

FIG. 9

| BUILDING | ID CARD READER | PLACE |
|---|---|---|
| ○○ BUILDING | ID CARD READER A | PATH A |
| ○○ BUILDING | ID CARD READER B | CONFERENCE ROOM B |
| ×× BUILDING | ID CARD READER C | CONFERENCE ROOM C |

F I G. 1 0

| BUILDING | ID CARD READER | PERSON-TO-BE-RECORDED | DATE | TIME |
|---|---|---|---|---|
| ○○ BUILDING | ID CARD READER A | X | 2006/11/30 | 15:26 |
| ○○ BUILDING | ID CARD READER A | X | 2006/12/03 | 9:51 |
| ○○ BUILDING | ID CARD READER B | X | 2006/12/03 | 10:12 |
| ×× BUILDING | ID CARD READER C | Y | 2006/12/01 | 14:20 |

FIG. 11

| PLACE | ACTION |
|---|---|
| PATH A | REST |
| CONFERENCE ROOM B | MEETING |
| CONFERENCE ROOM C | MEETING |

FIG. 13

ACTION RECORD SUPPORT PROGRAM, SYSTEM, DEVICE, AND METHOD

BACKGROUND OF THE INVENTION

1. Field of the Invention

The present invention relates to the technology of supporting recording the action of a person.

2. Description of the Related Art

Conventionally, a system for improving an operation has been well known. For example, when the current operation procedure and work time are input, the system analyzes the current situation and outputs an improvement proposition. It is necessary for the analysis of the current situation to detect the time taken for each task constituting the operation. As a result of the analysis, the point where waste resides is detected and the improvement proposition is output.

The system of the patent document 1 is an example of the conventional operation analysis support system. When the current operation procedure, etc. is input, the system quantifies the operation, compares it with a predetermined operation feature pattern and generates a model, and displays the feature of the operation, the model, and the improvement proposition. The form of input data is a table form for comprehensibility of a user. However, relating to data, it is necessary for the user to grasp and input the operation contents, process target, etc. by a hearing against operators, etc.

The conventional system is suitable for operations whose operation procedure is prepared. For example, it is suitable for a case such as a production line in a factory, etc. where the procedure of an operation is definite, an observer can visually confirm what an operator is doing, etc. because the observer can easily measure the time for each operation using a watch, etc. However, since correctly grasping and inputting an operation procedure of a non-prepared operation through a hearing, etc. is restricted, it is not expected to correctly analyze a non-prepared operation.

On the other hand, in an operation mainly performed as desk work, the procedure of the operation is not definite. Additionally, when a plurality of operations to be concurrently performed are included, the action itself is hardly measured externally. For example, a system engineer, a researcher, etc. who are engaged in knowledge work always think about their work, but can hardly be understood visually. At present, for the operations performed using computers in the desk work, the operation contents and the work time can be automatically grasped and analyzed to some extent by monitoring the computer operations. For the work not including computer operations, there is no system capable of grasping offline action even for a comparatively long time such as 30 minutes, 1 hour, etc. However, since a long recording time is required and it degrades the efficiency of the entire operation, it is not preferable to keep a record by allowing an operator to manually input a description of the operation contents and work time or select an option only because it is necessary to grasp the offline action to improve the operation. Therefore, it is desired to develop a system for automatically or semi-automatically recording the operation contents and operation procedure of an operator who is mainly engaged in desk work regardless of whether or not the operation includes a computer operation.

The operation not including a computer operation can include an operation which includes moving of a person such as going out and having a meeting with a client, etc. The patent documents 2 through 5 disclose systems which detect moving of a person.

The system of the patent document 2 performs the process depending on whether or not a user is present at his or her desk (for example, a message is accepted when the user is absent). A user can explicitly instruct the computer on his or her desk that he or she is absent or present, and the system can estimate the presence/absence state. The estimation is performed based on the location of a user detected by a camera, etc., schedule information, presence state history, etc.

The system of the patent document 3 estimates the action and the position of a user from a personal schedule table, and when a user terminal has the GPS (global positioning system) function, an estimated position is amended according to the GPS information, and a Web screen on which a map and store information, etc. relating to the position is displayed in a user-selectable manner is transmitted to the user terminal.

The system of the patent document 4 analyzes the movement of a user according to the position information and the time information noticed from a mobile terminal. In this system, the transportation, etc. used for travel is estimated based on the moving speed and a locus.

The patent document 5 discloses a terminal for recording a predetermined operation contents by a user pressing a predetermined key of the terminal and managing an operation. The movement such as a walk, etc. is a large factor of a loss in work. However, since it is repeated at a high frequency, it is not desired to input data to a terminal each time travel is performed because it is a laborious process. Therefore, the terminal further includes a vibration sensor, and automatically detects and records the movement of a walk, etc. of a person who carries the terminal.

However, the above-mentioned systems have the problems that they concentrate on the position and movement of a person, does not associate them with actual action, cannot correspond to a non-prepared operation, etc. Therefore, they are not suitable for use in automatically recording or supporting a user for semi-automatically recording in a unified method operation contents and a work time of work which includes an operation performed with a computer operation and an operation performed without a computer operation, and can be hardly prepared in a form.

[Patent Document 1] Japanese Patent Application Laid-open No. 2002-352064

[Patent Document 2] Japanese Patent Application Laid-open No. H10-268959

[Patent Document 3] Japanese Patent Application Laid-open No. 2002-189656

[Patent Document 4] Japanese Patent Application Laid-open No. H10-111877

[Patent Document 5] Japanese Patent Application Laid-open No. H11-143935

SUMMARY OF THE INVENTION

The present invention aims at supporting a user in recording offline action as action not performed by a computer operation. First to attain this, the present invention has to automatically estimate the contents of offline action and has to make it possible for a user to reduce the laborious process performed for recording data in such a way that all the user needs to do is to amend or approve an estimated result. Second, the present invention has to remove the feeling of a laborious process of recording data by estimating the contents of the offline action according to the information automatically acquired without consciousness.

In the descriptions below, a user whose action is to be recorded is referred to as a person-to-be-recorded, the action performed by a computer operation is referred to as online action, and the action performed without a computer operation is referred to as offline action. A program according to the present invention is used to direct a computer to perform the step of recognizing that offline action has occurred when online action has not occurred for or longer than a predetermined time. Then, it directs the computer to perform the step of acquiring action related information associated with the offline action of a person-to-be-recorded, and the step of estimating the contents of the offline action of the person-to-be-recorded according to the information. Then, it directs the computer to perform the step of receiving input data relating to the estimated contents such as the correctness of the estimated contents, an amendment point when the contents are not correct, etc.

The above-mentioned action related information can use the action schedule information about a person-to-be-recorded, the movement position information which indicates the position of a person-to-be-recorded and is transmitted from the position information transmission device, the immobile target position information indicating the position of an immobile target, the position-action correspondence in which the immobile target position information is associated with the contents of offline action, etc. depending on the aspect of an embodiment.

Depending on the style of embodiment, the position information transmission device can be a device carried by a person-to-be-recorded. Otherwise, a person-to-be-recorded carries a person-to-be-recorded identification device storing the information for identification of a person-to-be-recorded, the position information transmission device reads the information stored in the person-to-be-recorded identification device, and generates movement position information, and the position information transmission device can transmit the movement position information. The both methods can also be combined.

The immobile target refers to a target of an entity such as a structure such as a building, a road, etc., and each room in building, etc., and an abstract target such as a spot on a map.

The action record support program according to the present invention can be embodied as a standalone program, and also as a program operating in a client-server system. The action record support system according to the present invention can be embodied as a standalone system, and as a client-server system.

According to the present invention, first, an occurrence of offline action is automatically recognized without consciousness of a user, and the contents of the offline action is automatically estimated. Therefore, the user in the offline action can be free of the feeling of the trouble of recording data. Second, a user only has to give approval when the contents of estimated offline action are correct. Although estimation is not correct, only a supplement or an amendment point can be input. Therefore, the laborious operation of recording offline action by a user can be reduced. Third, since a user is almost free of the load as described above, offline action can be easily recorded. Therefore, the recorded contents can be utilized for various uses such as a work analysis, etc.

BRIEF DESCRIPTION OF THE DRAWINGS

FIG. 2 shows an example of a use according to a style of embodiment of the present invention;

FIG. 5 shows an example of action schedule information;

FIG. 7 shows an example of output of an action record log;

FIG. 9 shows an example of map information;

FIG. 10 shows an example of building information;

FIG. 11 shows an example of ID card reader history information;

FIG. 13 shows an example of the position-action correspondence; and

DESCRIPTION OF THE PREFERRED EMBODIMENTS

The styles of the embodiments of the present invention are explained below in detail by referring to the attached drawings.

Figure 1:
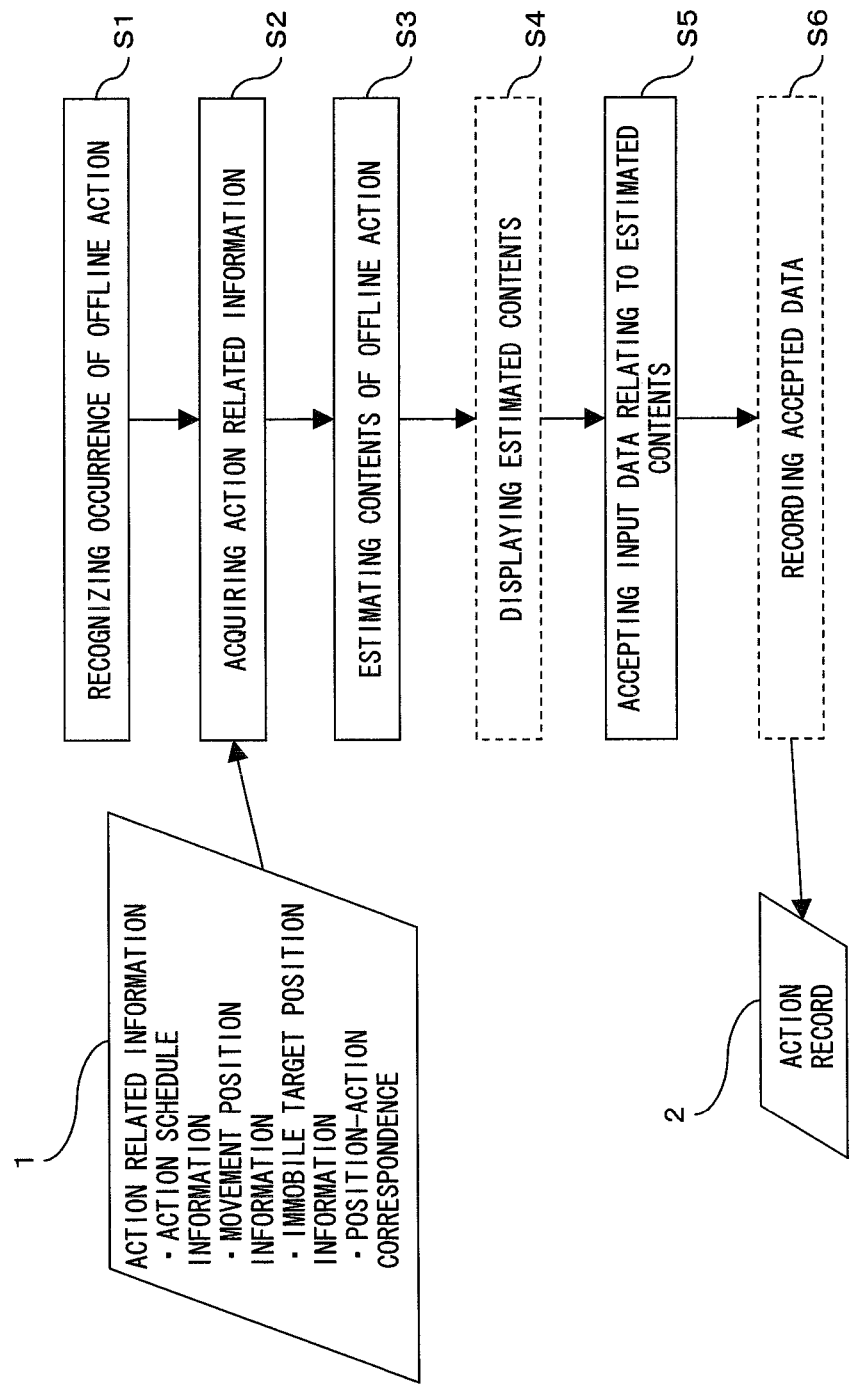
FIG. 1 shows the principle of the present invention.

FIG. 1 shows the principle of the present invention. The program according to the present invention recognizes in step S1 that offline action has occurred when online action has not occurred for or longer than a predetermined time. In step S2, action related information 1 required in estimating the contents of the offline action is acquired. In step S3, using the acquired information, the contents of the offline action are estimated. Then, the input data relating to the estimated contents such as whether or not the estimated contents are correct, the amendment point for the case where they are not correct, etc. are received in step S5.

The above-mentioned action related information 1 can use the action schedule information about a person-to-be-recorded, the movement position information which indicates the position of a person-to-be-recorded and is transmitted from the position information transmission device, the immobile target position information indicating the position of an immobile target, the position-action correspondence in which the immobile target position information is associated with the contents of offline action, etc. depending on the aspect of an embodiment.

Depending on the style of embodiment, the position information transmission device can be a device carried by a person-to-be-recorded. Otherwise, a person-to-be-recorded carries a person-to-be-recorded identification device storing the information for identification of a person-to-be-recorded, the position information transmission device reads the information stored in the person-to-be-recorded identification device, and generates movement position information, and the position information transmission device can transmit the movement position information. The both methods can also be combined.

The immobile target refers to a target of an entity such as a structure such as a building, a road, etc., and each room in building, etc., and an abstract target such as a spot on a map. Since the immobile target is immobile on the whole, the immobile target position information is static information in principle, and a change is made only when an exceptional event occurs, for example, when a new building is built. The action related information 1 is not to be consciously generated or transmitted for a record of offline action by a person-to-be-recorded.

Furthermore, according to an aspect of an embodiment, step S4 is performed between steps S3 and S5 in the program according to the present invention to accept the input data relating to the estimated contents in step S5, and the estimated contents are displayed on the display device. At the displayed contents, user determines whether or not the contents are correct, and supplements and amends the contents as necessary. Then, the data input by a user such as whether or not the estimated contents are correct, supplements, amendments, etc. are accepted in step S5 by the program of the present invention. The program according to the present invention performs step S6 after step S5, records the accepted data, and accumulates the data as action record information 2. Since steps S4 and S6 are additional elements, they are indicated by dotted lines in FIG. 1.

FIG. 2 shows an example of a use according to a style of embodiment of the present invention. FIG. 2 shows the entire system presenting a work improvement proposition after recording and analyzing the action of each worker engaged in his or her job. FIG. 2 is constituted by an action record support system 100 according to the style of the embodiment of the present invention and an operation analysis system 105.

The action record support system 100 records the online operation (online action) performed using a computer, and the offline operation (offline action) performed without a computer. The action record support system 100 records an action history 104. The action history 104 includes online action such as mail generation 101, material (electronic document) generation 102, etc., and offline action such as a conference 103, etc.

The online action can be recoded using an operation log of a computer.

When the action history 104 is transmitted to the operation analysis system 105 as log data, the computer and a user analyzes and checks the contents of the data. In analyzing the data, a tool such as a graph 106, etc. can be used. The operation analysis system 105 can use an existing system for receiving the current operation contents as input, extracting the rate of the work time, the relationship between the operations, etc., and outputting an improvement proposition.

Conventionally, it is hard to grasp the offline operation such as the conference 103, and generate data to be supplied to the operation analysis system 105. However, since the action record support system 100 according to the present invention can easily record the offline action, it can be combined with the operation analysis system 105 as shown in FIG. 2 to improve work efficiency.

The action record support system according to the present invention can be realized by a standalone system or a client-server system. When it is realized as a client-server system, the respective functions of the client and the server can be changed depending on the aspect of an embodiment. That is, a function realized by a client in a style of embodiment can be realized by a server according to another style of embodiment.

Figure 3:
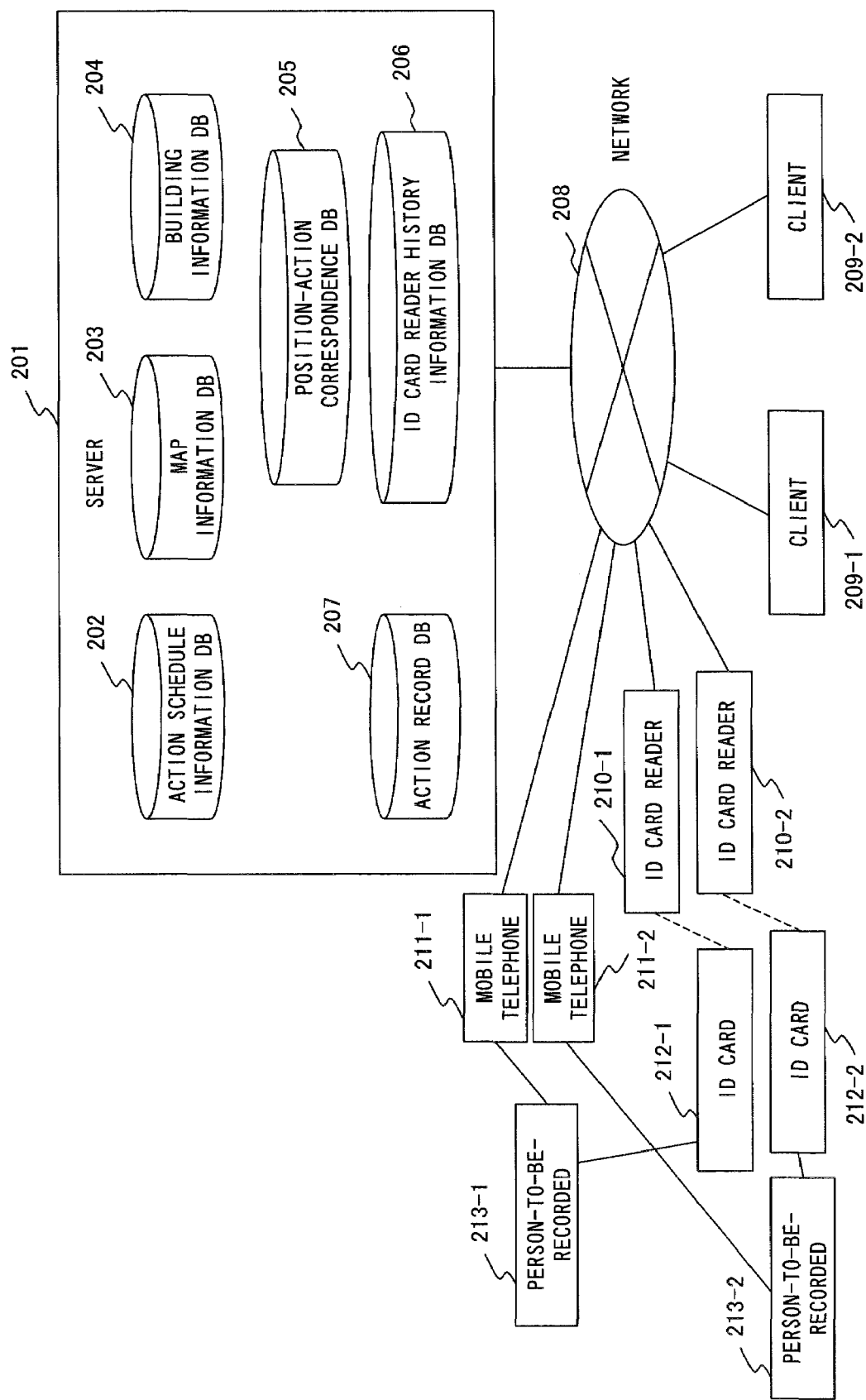
FIG. 3 is a block diagram according to a style of embodiment of the action record support system of the present invention.

FIG. 3 is a block diagram according to a style of embodiment when the present invention is realized as a client-server system. In this style of embodiment, the system comprises a server 201 for supporting action recording and one or more clients (a client 209-1 and a client 209-2 in FIG. 3), and they are connected to a network 208.

The storage device such as a hard disk, etc. of the server 201 stores various types of action related information 1 for estimation of the contents of offline action. Practically, they are an action schedule information DB 202, a map information DB 203, a building information DB 204, a position-action correspondence DB 205, and an ID card reader history information DB 206. The details of these pieces of information are described later. Furthermore, the storage device of the server 201 stores an action record DB 207 for recording online action and offline action.

The network 208 is, for example, a LAN (local area network), a WAN (wide area network), the Internet, etc. In addition to the server 201, the client 209-1, and the client 209-2, an ID card reader 210-1, an ID card reader 210-2, a mobile telephone 211-1, and a mobile telephone 211-2 are connected to the network 208. The ID card reader 210-1 and the ID card reader 210-2 are equipment units for reading an ID card (identification card) 212-1 and an ID card 212-2 for use in managing the entrance and exit of an employee, etc. The ID card reader according to this style of embodiment is, for example, mounted in a plurality of rooms in a building of a company, and the information about a read ID card can be transmitted to the server 201 through the network 208. Furthermore, in another style of embodiment, for example, the server 201, the client 209-1, the client 209-2, the ID card reader 210-1 are connected to the LAN, and the ID card reader 210-2, the mobile telephone 211-1, the mobile telephone 211-2 are connected are connected through the Internet.

In this style of embodiment, the system supports the action record of a plurality of persons-to-be-recorded (in FIG. 3, a person-to-be-recorded 213-1 and a person-to-be-recorded 213-2). In this example, it is assumed that the person-to-be-recorded 213-1 carries the mobile telephone 211-1 and the ID card 212-1, and the person-to-be-recorded 213-2 carries the mobile telephone 211-2 and the ID card 212-2.

Although the details are described later, but the mobile telephone 211-1 and the mobile telephone 211-2 are mobile telephones having the GPS function, and examples of the above-mentioned position information transmission device. The ID card 212-1 and the ID card 212-2 are examples of the above-mentioned person-to-be-recorded identification device, and the ID card reader 210-1 and the ID card reader 210-2 are examples of the corresponding position information transmission devices. The information transmitted from the mobile telephone 211-1 and the mobile telephone 211-2 to the server 201 through the network 208, and the information read from the ID card 212-1 and the ID card 212-2 by the ID card reader 210-1 and the ID card reader 210-2 and transmitted from the ID card readers to the server 201 through the network 208 correspond to the above-mentioned movement position information. These pieces of information are, as described later, used in estimating the contents of the offline action of the person-to-be-recorded 213-1 and the person-to-be-recorded 213-2.

Figure 4:
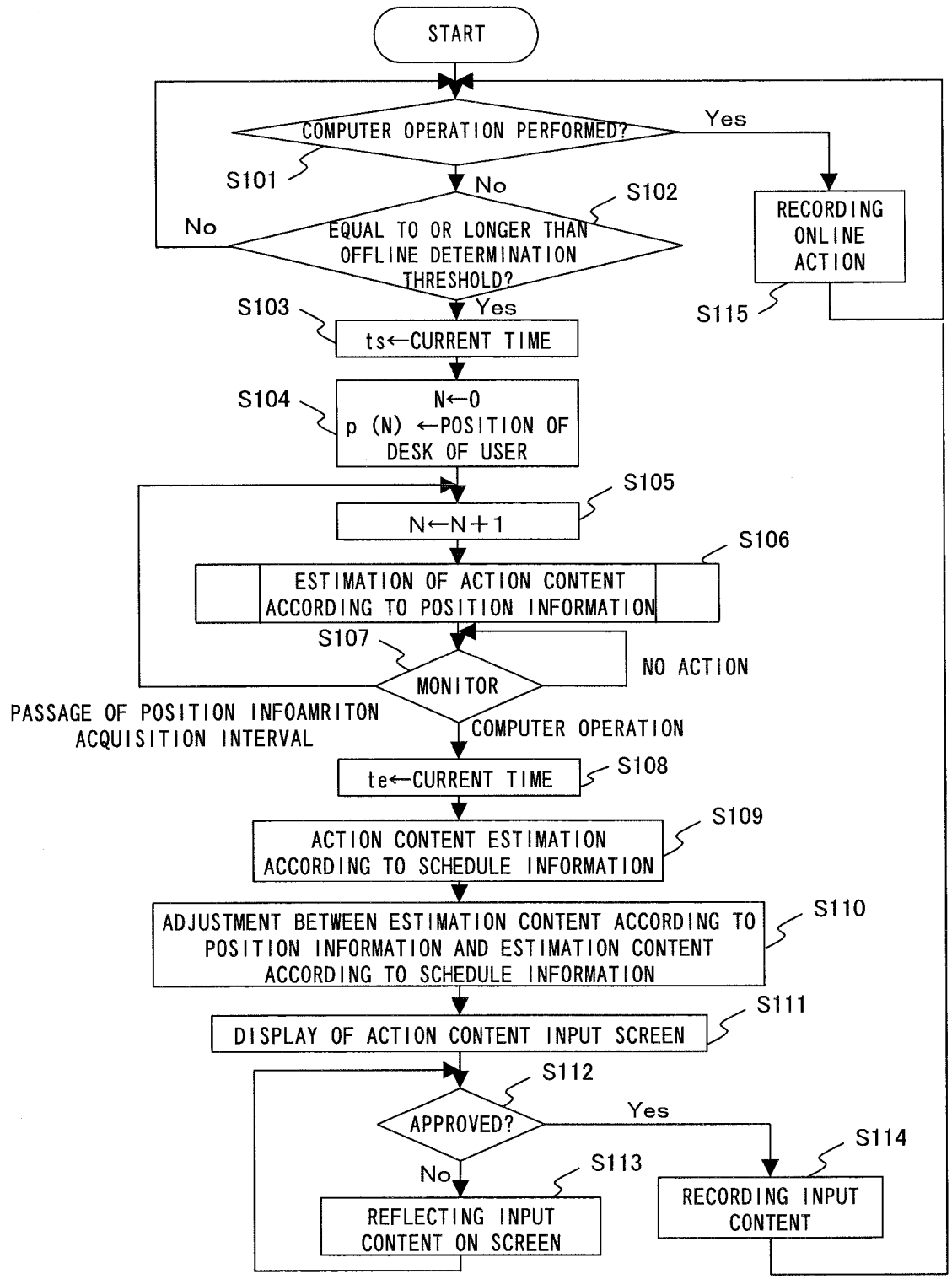
FIG. 4 is a flowchart for explanation of an operation according to a style of embodiment of the action record support system of the present invention.

FIG. 4 is a flowchart for explanation of the operation according to a type of embodiment of the action record support system of the present invention. The operation according to a type of embodiment when the present invention is realized as a client-server system is described below by referring to FIG. 4. In addition, the operation of the system relating to a person-to-be-recorded is explained.

In step S101, a client determines whether or not a computer operation has been detected in the client (for example, the client 209-1 shown in FIG. 3) used by a person-to-be-recorded (for example, the person-to-be-recorded 213-1 shown in FIG. 3). When a computer operation is detected, the determination is YES, control is passed to step S115. When a computer operation is not detected, the determination is NO, and control is passed to step S102.

The computer operation is an operation performed using an input device of a client. For example, pressing a key and a button on the keyboard, moving a cursor using a pointing device such as a mouse, and performing an operation such as clicking a mouse correspond to a computer operation.

In step S102, the client determines whether or not the time in which a computer operation is not detected has continued for or longer than a predetermined time (hereinafter referred to as an "offline determination threshold"). The offline determination threshold is set to, for example, 10 minutes. The offline determination threshold can be a system-set default value, a system administrator set value, a value set by each person-to-be-recorded, etc.

If a computer operation has not been detected for or longer than the offline determination threshold, then the determination in step S102 is YES, and control is passed to step S103. At this time, the client notifies the server (for example, the server 201 shown in FIG. 3) that the offline action of the person-to-be-recorded has occurred. Thus, the server recognizes that offline action has occurred.

If the offline determination threshold has not been exceeded since the previous computer operation was detected, then the determination in step S102 is NO, and control is returned to step S101. During the power-up, the client always monitors the presence/absence of the computer operation.

In step S103, the server substitutes the current time for the variable ts indicating the estimated value of the starting time of the offline action. Depending on the style of embodiment, another time such as the offline determination threshold before the current time, etc. can be used as ts. After the substitution control is passed to step S104.

In step S104, the server performs the initialization for the loop formed in steps S105 through S107. Practically, 0 is substituted for N, the position of the desk of a person-to-be-recorded is substituted for p(N), that is, p(0), and stored respectively in the memory, etc. of the server. N is a variable indicating the ordinal number of the estimation of the action contents according to the position information to a certain offline action. The position information practically refers to the information stored in the map information DB 203, the building information DB 204, the position-action correspondence DB 205, and the ID card reader history information DB 206, and the movement position information transmitted from the mobile telephone 211-1, the ID card reader 210-1, etc. as shown in FIG. 3. p(N) refers to the movement position information indicating the position of the person-to-be-recorded used in the N-th estimation. p(N) is expressed by, for example, the longitude and the latitude. The value of p(N) for each N is stored in the memory, etc. in the server. The position of the desk of the person-to-be-recorded can be stored in advance in the storage device that can be referred to by the server depending on the aspect of an embodiment. Otherwise, for example, when control is passed from step S102 to step S103, a notification of the position of the desk of the person-to-be-recorded can be transmitted from the client to the server. When the initialization is completed, control is passed to step S105.

In step S105, the server substitutes N+1 for the variable N. This refers to that if the estimation (step S106) of the offline action according to the position information has already been performed N times, the (N+1)th estimation is currently being performed. After the update of the value of N, control is passed to step S106.

In step S106, the server estimates the contents of the offline action according to the position information, and the estimated contents are stored in the memory, etc. of the server.

The detailed operation is described later, and the estimation is performed at a predetermined time interval (hereinafter referred to as a "position information acquisition interval"). The position information acquisition interval is set at five-minute intervals, for example. The position information acquisition interval can be a system-determined default value, a system administrator determined value, a value set by each person-to-be-recorded, etc. When the contents of the offline action are estimated in step S106, control is passed to step S107.

In step S107, it is monitored whether or not the time of the position information acquisition interval has passed, and the computer operation by a person-to-be-recorded has been performed. When the server detects the lapse of time of the position information acquisition interval, control is returned to step S105. As described above, the client constantly monitors the presence/absence of the computer operation during the power-up. Then, when the client detect the computer operation after the determination becomes YES in step S102, the client notifies the server of it. At the notification, when the server recognizes that the computer operation by the person-to-be-recorded has been detected, control is passed to step S108. If they are not detected, the process in step S107 is repeated to continue the monitor.

In step S108, the server substitutes the current time for the variable te indicating the estimated value of the termination time of the offline action, thereby passing control to step S109.

In step S109, the server estimates the contents of the offline action according to the action schedule information. Practically, the action schedule information about the person-to-be-recorded stored in the action schedule information DB 202 is retrieved. The time range specified as a retrieval condition is the range from the start of the offline action to the end of it, that is, the range from time ts to time te. The action schedule information scheduled in the time range at least partly overlapping the above-mentioned range is retrieved. If there is the action schedule information satisfying the retrieval condition, the server estimates that the action schedule information corresponds to the contents of the offline action, stores it in the memory, etc. of the server, and control is passed to step S110. If there is no action schedule information satisfying the retrieval condition, control is passed to step S110 as is.

FIG. 5 shows an example of the action schedule information used in step S109. The action schedule information is stored in the action schedule information DB 202. The action schedule information DB 202 is stored in the storage device that can be referred to by the server. FIG. 5 has four items, that is, a "date", a "time", an "operation schedule", and a "place", and stores the schedule about what is performed where and when. The action schedule information can be added, changed, and deleted by a person-to-be-recorded, etc.

For example, when the client does not detect computer operations from 9:50 to 12:09 on Dec. 1, 2006, and a computer operation is detected at 12:10, the process in step S109 is performed at 12:10, and an action schedule "having a meeting relating to xx in the conference room A from 10:00 to 12:00 on Dec. 1, 2006" in the action schedule information shown in FIG. 5 is retrieved.

The action schedule information can be constituted in various ways depending on the aspect of the embodiment. For example, any form other than a table form can be used. The number of items can be other than 4. For example, when the schedules of a plurality of persons-to-be-recorded are managed in the action schedule information DB 202, the item of a user name identifying a person-to-be-recorded can be provided.

In step S110, the server adjusts the contents of the offline action stored in steps S106 and S109 as necessary, and transmits the data corresponding to the contents after the adjustment to the client. The process in step S110 can be changed in various manners depending on the aspect of the embodiment. For example, the estimation contents according to the action schedule information and the estimation contents according to the position information can be transmitted to the client without adjustment. Otherwise, when there are estimation contents for a certain time period, one content can prioritize the other. For example when there is action schedule information only in a part of the time period in the range from time ts to time te, the range for which the estimate cannot be performed according to the action schedule information can be supplemented with the estimation contents according to the position information. When there are their estimation contents for a certain time period, the determination as to whether or not inconsistency occurs can be performed in step S110. After an adjustment made as necessary and the data transmission to a client, control is passed to step S110.

Figure 6:
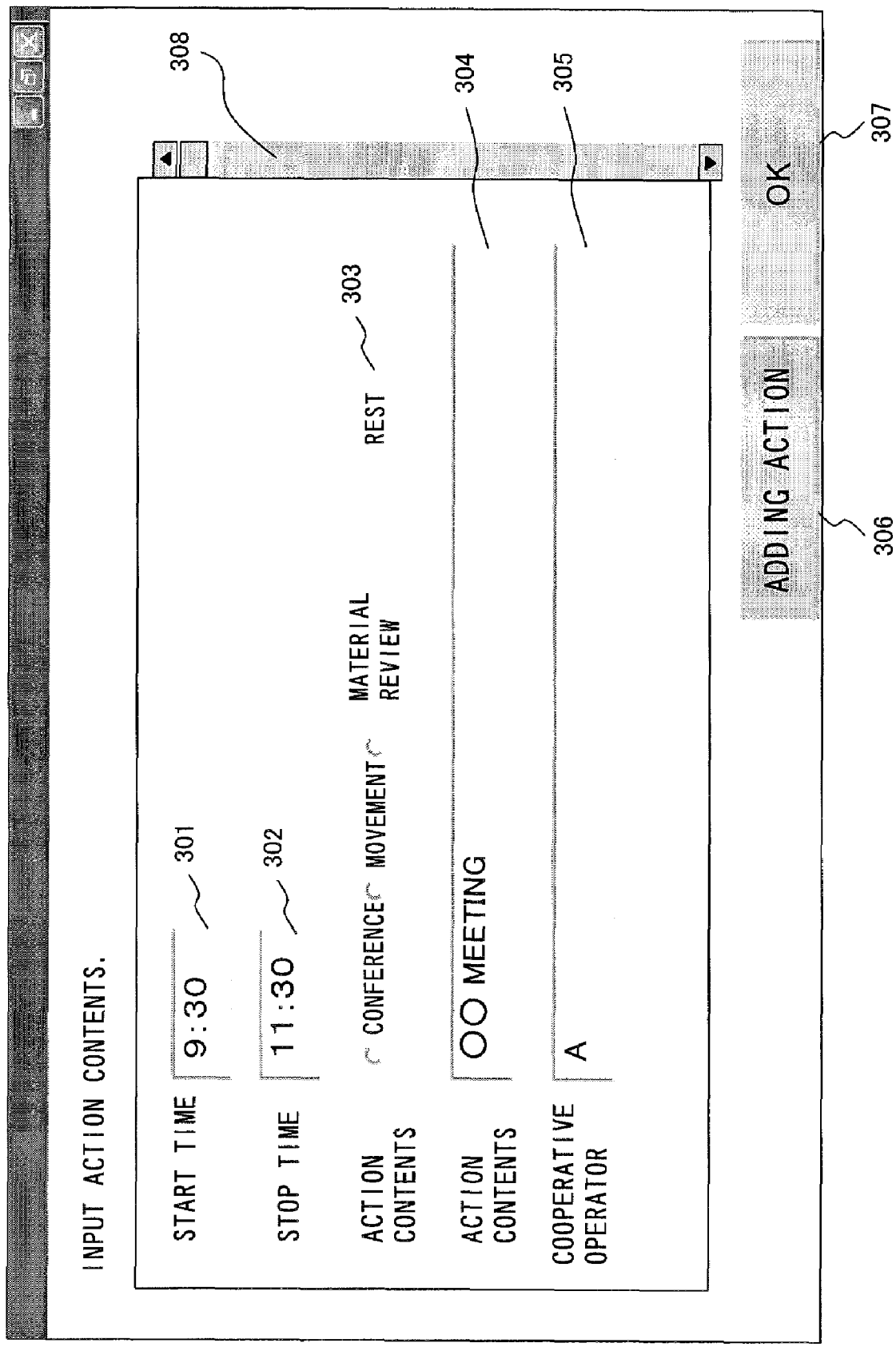
FIG. 6 shows an example of an input screen of action contents.

In step S111, based on the data transmitted from the server, the client displays the input screen of the action contents as shown in FIG. 6 on the display device of the client. The details of FIG. 6 are described later, but what is displayed as a default on the input screen are the estimation contents of the offline action transmitted from the server to the client in step S110. After the display of the input screen, control is passed to step S112.

In step S112, the client determines whether or not the approval button 307 is pressed on the input screen of the action contents and the contents of the input screen is approved thereby. If a approval button 307 is pressed, the determination is YES, and control is passed to step S114. If the approval button 307 is not pressed, the determination is NO, and control is passed to step S113. "Press" refers to, for example, the cursor is moved to the approval button 307, and a clicking operation is performed using a mouse.

In step S113, if the person-to-be-recorded performs some sort of input such as selection, amendment, deletion, etc. on the input screen of the action contents, the client reflects it on the display contents on the screen, and control is returned to step S112. The loop formed in steps S112 and S113 indicates waiting while receiving input from the person-to-be-recorded until the display contents on the input screen is approved.

In step S114, the data corresponding to the contents approved in step S112 is transmitted from the client to the server, and the server records the contents of the offline action in the action record DB 207 based on the received data. After performing the processes, control is returned to step S101. The action record DB 207 is stored in the storage device in which the server can rewrite it, and the data in the action record DB 207 can be output in the form as shown in FIG. 7. The details are described later.

The process in step S115 is performed when the client detects the computer operation in step S101. That is, when online action occurs, the process in step S115 is performed.

In step S115, the client records the contents of the online action in the action record DB 207. That is, in this style of embodiment, the data in the storage device storing the action record DB 207 can also be rewritten by the client. In steps S101 and S115, a well-known technology of recording a log of a computer operation can be used. When the contents of the online action are recorded, control is returned to step S101.

As described above, the process in FIG. 4 is repeatedly performed.

FIG. 6 shows an example of an input screen of the action contents displayed in step S111 shown in FIG. 4. FIG. 6 shows a start time input field 301, a stop time input field 302, an action contents selection field 303, an action contents input field 304, a cooperative operator input field 305, a plural operation coping button 306, and an approval button 307. When the approval button 307 is pressed, the display contents shown in FIG. 6 are recorded in the action record DB 207.

In the start time input field 301, the stop time input field 302, the action contents selection field 303, the action contents input field 304, and the cooperative operator input field 305, the contents of the estimated offline action are displayed or selected as a default. For an item that cannot be estimated, the default is blank or not selected. FIG. 6 shows an example of expressing the action contents by a combination of the action contents selection field 303 for selection of rough classification and the action contents input field 304 in free description form.

In a style of embodiment, what is estimated as the start time (variable ts shown in FIG. 4) of the offline action is the latest time of the computer operation. Therefore, the latest time at which the computer operation is performed is displayed as a default in the start time input field 301. In another style of embodiment, what is estimated as the stop time (variable te shown in FIG. 4) of offline action is the time at which a computer operation is resumed. Therefore, the time at which the computer operation is resumed is displayed as a default in the stop time input field 302. In another style of embodiment, for example, when a user goes back home without performing online action after the operation of offline action, the stop time is estimated according to the action schedule information, and, for example, the time other than the time when a computer operation is resumed on the next operation day is displayed as a default in the stop time input field 302.

The person-to-be-recorded first confirms the display contents of the input form shown in FIG. 6. When there is no portion different from the actual action, the approval button 307 is pressed. If there is a portion different from the actual action, only the portion is amended, and the approval button 307 is pressed. These operations correspond to the processes in steps S111 and S113.

When plural kinds of offline action are continuously performed, in an aspect of embodiment, a set of the start time input field 301, the stop time input field 302, the action contents selection field 303, the action contents input field 304, and the cooperative operator input field 305 is required for the number of kinds of offline action. For example, 9:30 to 11:30 correspond to the offline action. When three meetings are held during the two hours, three sets of input forms are required. In this case, on the input screen of action contents, it is preferable to scroll any number of input forms for display using a scroll bar 308. If the execution of plural kinds of offline action is correctly estimated, the sets of input forms constituted by the start time input field 301, the stop time input field 302, the action contents selection field 303, the action contents input field 304, and the cooperative operator input field 305 are displayed in step S111 for the number of kinds. In each set, the estimated action is displayed or selected as a default. If the execution of plural kinds of offline action is not correctly estimated, an input form i.e. a set of the start time input field 301, the stop time input field 302, the action contents selection field 303, the action contents input field 304, and the cooperative operator input field 305 is added by the person-to-be-recorded pressing the plural operation coping button 306 in step S113. Therefore, the person-to-be-recorded can input data therein. When plural kinds of offline action are continuously performed, the person-to-be-recorded presses the approval button 307 when confirming the display contents and making amendments as necessary.

In another aspect of embodiment, when plural kinds of offline action are continuously performed, the number of input forms is one set. In this case, for example, when a form including a predetermined delimiter, etc. is predetermined, the plural contents input based on the form can be separated in each of the start time input field 301, the stop time input field 302, the action contents selection field 303, the action contents input field 304, and the cooperative operator input field 305.

According to an aspect of embodiment, any type of input form can be adopted. For example, the start time input field 301 and the stop time input field 302 can be fields indicating the date and time, not the time. Furthermore, the action contents selection field 303 can be selected exclusively, or any of a plurality of options can be selected at a time.

Additionally, a system for protection against an input error can be added by recording the display contents in the action record DB 207 after displaying input contents confirmation screen after the approval button 307 is pressed, and a person-to-be-recorded confirming the contents on the input contents confirmation screen.

FIG. 7 shows an example of output of an action record log. The action record log includes the contents of the offline action recorded in step S114 and the contents of the online action recorded in step S115, and is stored in the action record DB 207. In the example shown in FIG. 7, the first three records are the record of the online action, and the last record is the record of the offline action. Both the online action and offline action are expressed by the common items of "start time", "stop time", "work time", "outline of operation", and "place". The action record log can be analyzed by the operation analysis system 105, etc. shown in FIG. 2, where online action and offline action can be analyzed in a uniform manner, to generate a work efficiency improvement proposition, etc.

Depending on the aspect of embodiment, it is possible to add various changes to the data form and output form of an action record log. For example, an action record log is recorded in the data form other than a table form, is converted into a table form, and then is output in the table form. Of course, output form can be any form other than a table form. For example, other items such as "cooperative operator", etc. can be furthermore output. Any item shown in FIG. 7 can be omitted in the output. In the output example shown in FIG. 7, the work time is displayed. However, only the start time and the stop time are recorded in the action record DB 207, and the work time can be calculated at output time. In the online action, the "one's desk" can be automatically output to "place".

Figure 8:
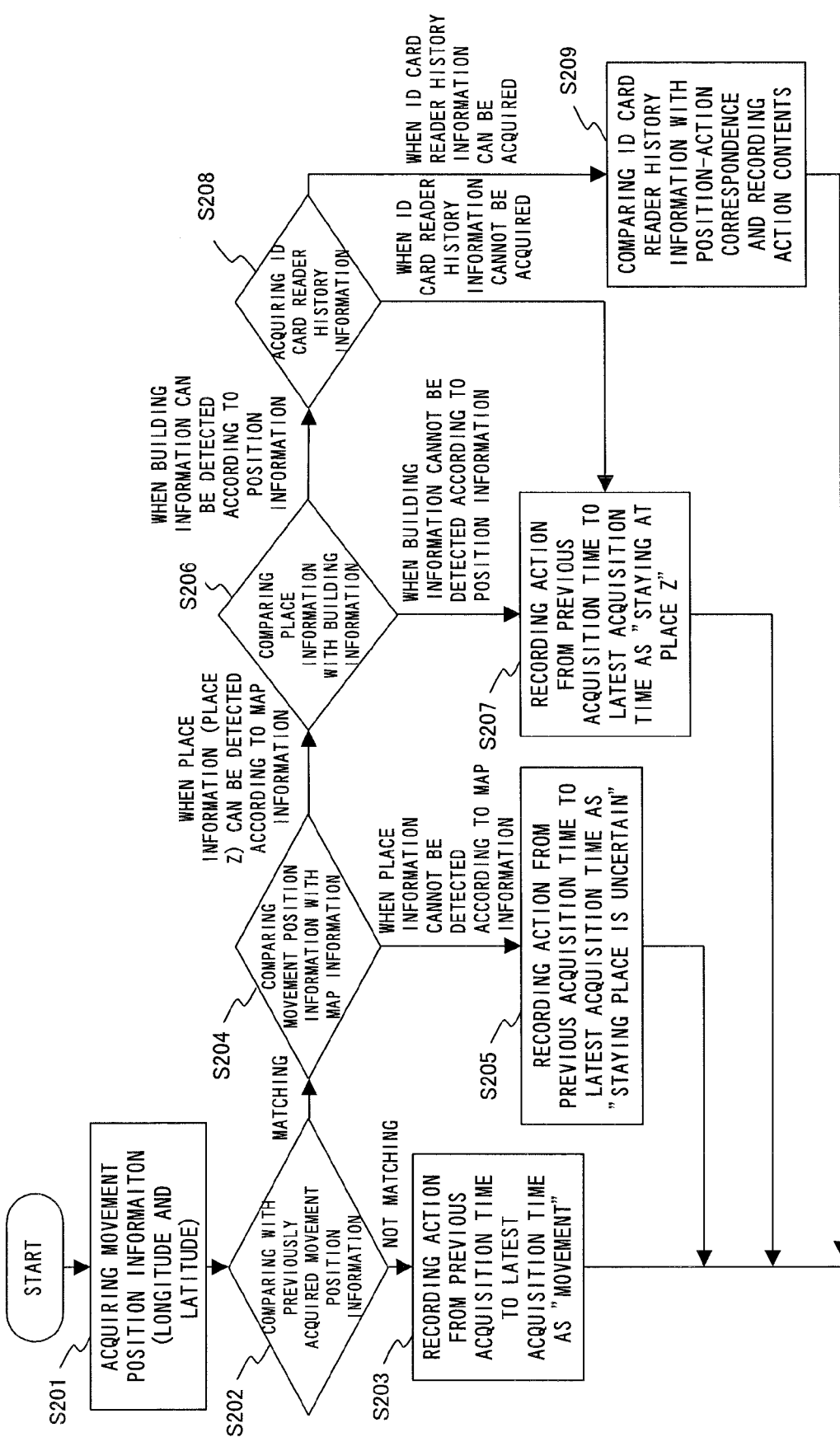
FIG. 8 is a flowchart for explanation of the details of the operation according to a style of an embodiment of the action record support system of the present invention.

Next, by referring to FIG. 8, the process performed in step S106 shown in FIG. 4 is explained in detail in a style of embodiment of the action record support system according to the present invention. As described above, this process is performed at position information acquisition intervals (for example, every five minutes). As in the style of embodiment shown in FIG. 4, the present invention is embodied as a client-server system in FIG. 8, and a server performs the process in step S106 as explained below.

In this style of embodiment, as described in regard to FIG. 3, a person-to-be-recorded carries a mobile telephone with the GPS function and an ID card for use in the management of entrance and exit in the company. It is assumed that the power source of the mobile telephone is constantly ON. The ID card can be any type of card such as a contact-type magnetic card, a card-shaped RFID (radio frequency identification) tag, etc.

In step S201, using the mobile telephone having the GPS function of the person-to-be-recorded, the server acquires the movement position information p(N) about the place in which the person-to-be-recorded can be located, and stores the information in the memory, etc. of the server. The time at which the p(N) is acquired is hereinafter expressed as t(N). The movement position information p(N) corresponds to the action related information 1 shown in FIG. 1, and more specifically corresponds to the movement position information. In this style of embodiment, the movement position information p(N) acquired in step S201 is based on the longitude and the latitude. In this style of embodiment, the server transmits the send request for the movement position information to a mobile telephone, the mobile telephone return the movement position information to the server in response to the request. When the server acquires the movement position information p(N), control is passed to step S202.

In step S202, the server compares the previously acquired movement position information with the lately acquired movement position information, and determines whether or not they match. That is, it is determined whether or not p(N−1)=p(N). When N=1, p(N−1) is stored in the memory, etc. of the server when the process in step S104 is performed as shown in FIG. 4. When N>1, p(N−1) is stored in the memory, etc. of the server when the process in step S106 is previously performed as shown in FIG. 4. Therefore, in step S202, the stored p(N−1) is read, and compared with p(N).

When p(N−1)=p(N), control is passed to step S204. When p(N−1)≠p(N), control is passed to step S203.

The process in step S203 is performed when p(N−1)≠p(N) In step S203, the server estimates that the offline action of the person-to-be-recorded from the time t(N−1) to the time t(N) is "movement". After the estimated contents are stored in the memory, etc. of the server, the process terminates.

The process in step S204 is performed when p(N−1)=p(N) That is, it is performed when it can be assumed that the person-to-be-recorded stays in the same point from the time t(N−1) to the time t(N). The server retrieves the place corresponding to the movement position information p(N) according to the map information DB 203 to check the place where the person-to-be-recorded stays. The map information DB 203 is stored in the storage device which can be referred to by the server.

FIG. 9 shows an example of map information stored in the map information DB 203. The map information is stored in advance, and is the information which is relatively static and not frequently updated. FIG. 9 shows three items of "longitude", "latitude", and "place". A place can be detected from the longitude and the latitude. In the example shown in FIG. 9, the "place" is expressed by the name of a station or that of a building, but can also be expressed by the name of a company, an address, etc. The information recorded in the column "place" is hereinafter referred to as "place information". Since the map information is the information indicating the position of a target such as a structure which is immobile on the whole, it corresponds to the action related information shown in FIG. 1, and more specifically to immobile target position information. The place information refers to the above-mentioned immobile target.

The map information can be designed in various configurations depending on the aspect of embodiment. For example, any form other than a table form can be used. The number of items can be any number other than three. For example, an item showing the name of a station or a building and an item showing an address can be separately provided. Although the "place" is expressed by name for simple explanation in FIG. 9, two items can be provided to express a place, that is, an identifier for management of data and a name comprehensible for a user.

When a place corresponding to the movement position information p(N) is detected as a result of retrieving the map information DB 203 in step S204, the server stores the place information as a place Z in the memory, etc., and control is passed to step S206. If a place corresponding to the movement position information p(N) is not retrieved as a result of the retrieval, control is passed to step S205.

The process in step S205 is performed when p(N−1)≠p(N), and when the place information corresponding to p(N) cannot be detected from the map information. Therefore, it is estimated in step S205 that the offline action of a person-to-be-recorded from the time t(N−1) to the time t(N) is "staying place is uncertain" (staying at a position, but the position is uncertain). After the estimated contents are stored in the memory, etc. of a server, the process terminates.

The process in step S206 is performed when p(N−1)≠p(N), and when the place information corresponding to p(N) can be detected from the map information. That is, it is performed when it can be estimated that a person-to-be-recorded stays in the place Z from the time t(N−1) to the time t(N). The server retrieves in step S206 the place corresponding to the place Z from the building information DB 204 to use the detailed information in the place Z, if available. The building information DB 204 is stored in the storage device that can be referred to by the server.

FIG. 10 shows an example of the building information stored in the building information DB 204. The building information is stored in advance, and is static information not frequently updated. FIG. 10 shows three items "building", "ID card reader", and "place". The "building" shown in FIG. 10 is an item corresponding to the "place" in FIG. 9, and the "place" in FIG. 10 is an item indicating the place in more detail such as each room, etc. in the "building" shown in FIG. 10. The building information is designed such that a place corresponding to an ID card reader can be retrieved based on the building and the ID card reader in the building. For example, in the example shown in FIG. 10, the "ID card reader A" provided in the building "○○ Building" is mounted in the "path A" or near the entrance of the "path A", and it is assumed that a person who allows the "ID card reader A" to read his/her ID card has entered the "path A". The building information is the information indicating the position of a target such as a building, an ID card reader, a room, etc. in the building which are immobile in principle. Therefore, the building information corresponds to the action related information shown in FIG. 1, and more specifically to the immobile target position information. In FIG. 10, the "building", the "ID card reader", and the "place" is the information indicating the above-mentioned immobile target.

The building information can be designed in various configurations depending on the aspect of embodiment. For example, any form other than a table form can be used. The number of items can be any number other than three. For example, two items can be provided to express the "place", that is, an identifier for management of data and a name comprehensible for a user. The system of an identifier for the "building", etc. can be optionally designed. However, because the "building" shown in FIG. 10 corresponds to the "place" shown in FIG. 9, it is necessary to consider the relationship with other information. For example, the same identifier has to be used between the "building" shown in FIG. 10 and the "place" shown in FIG. 9 as an identifier indicating the "○○ Building".

In step S206, when the information corresponding to the place Z is detected as a result of retrieving the building information DB 204, control is passed to step S208 to use the information. If it is not detected, control is passed to step S207. For example, when the place Z is a building not provided with an ID card reader, control is passed to step S207.

The process in step S207 is performed when p(N−1)≠p(N), the place information (place Z) corresponding to p(N) is detected from the map information, and the information corresponding to the place Z is not detected from the building information. In step S207, it is estimated that the offline action of the person-to-be-recorded from the time t(N−1) to the time t(N) is "staying at the place Z". After the estimated contents are stored in the memory, etc. of the server, the process terminates.

The process in step S208 is performed when p(N−1)≠p(N), the place information (place Z) corresponding to p(N) is detected from the map information, and the information corresponding to the place Z is detected from the building information. That is, it is performed when it is estimated that the person-to-be-recorded stayed in the place Z from the time t(N−1) to the time t(N).

Although the process in step S208 is performed only when the information about the place Z (for example, the "○○ Building" shown in FIGS. 9 and 10) is included in the building information, it is uncertain whether or not the person-to-be-recorded actually stays in a specific room through the place where the ID card reader is amounted in the place Z. Then, in step S208, the server retrieves the ID card reader history information DB 206. The ID card reader history information DB 206 is stored in the storage device that can be referred to by the server.

FIG. 11 shows an example of the ID card reader history information stored in the ID card reader history information DB 206. A record is generated each time the ID card of a person-to-be-recorded is read by any ID card reader, and added to the ID card reader history information. That is, the ID card reader history information is dynamically changed. FIG. 11 includes five items "building", "ID card reader", "person-to-be-recorded", "date", and "time" so that it can be detected who allows when and which ID card reader to read an ID card. Since the ID card reader history information is the information indicating the position of a mobile person-to-be-recorded, it corresponds to the action related information 1 shown in FIG. 1, and more specifically to movement position information. The movement position information p(N) acquired in step S201 is the movement position information expressed by coordinates of the longitude and the latitude, but the ID card reader history information is the movement position information expressed based on an immobile target such as a building, an ID card reader, etc. in place of coordinate axes.

The ID card reader history information can be designed in various configurations depending on the aspect of embodiment. For example, any form other than a table form can be used. The number of items can be any number other than five. For example, depending on the system of an identifier, there can be a case where a building can be uniquely specified from an identifier of an ID card reader, and no "building" column is required.

In the example shown in FIG. 11, a user requires authentication using an ID card only at entrance, but does not require it and can freely exit the room without using the ID card. In this case, the retrieval in step S208 is somewhat complicated. Therefore, using the time chart shown in FIG. 12 as an example, the processes in step S208 are described below in detail.

Figure 12:
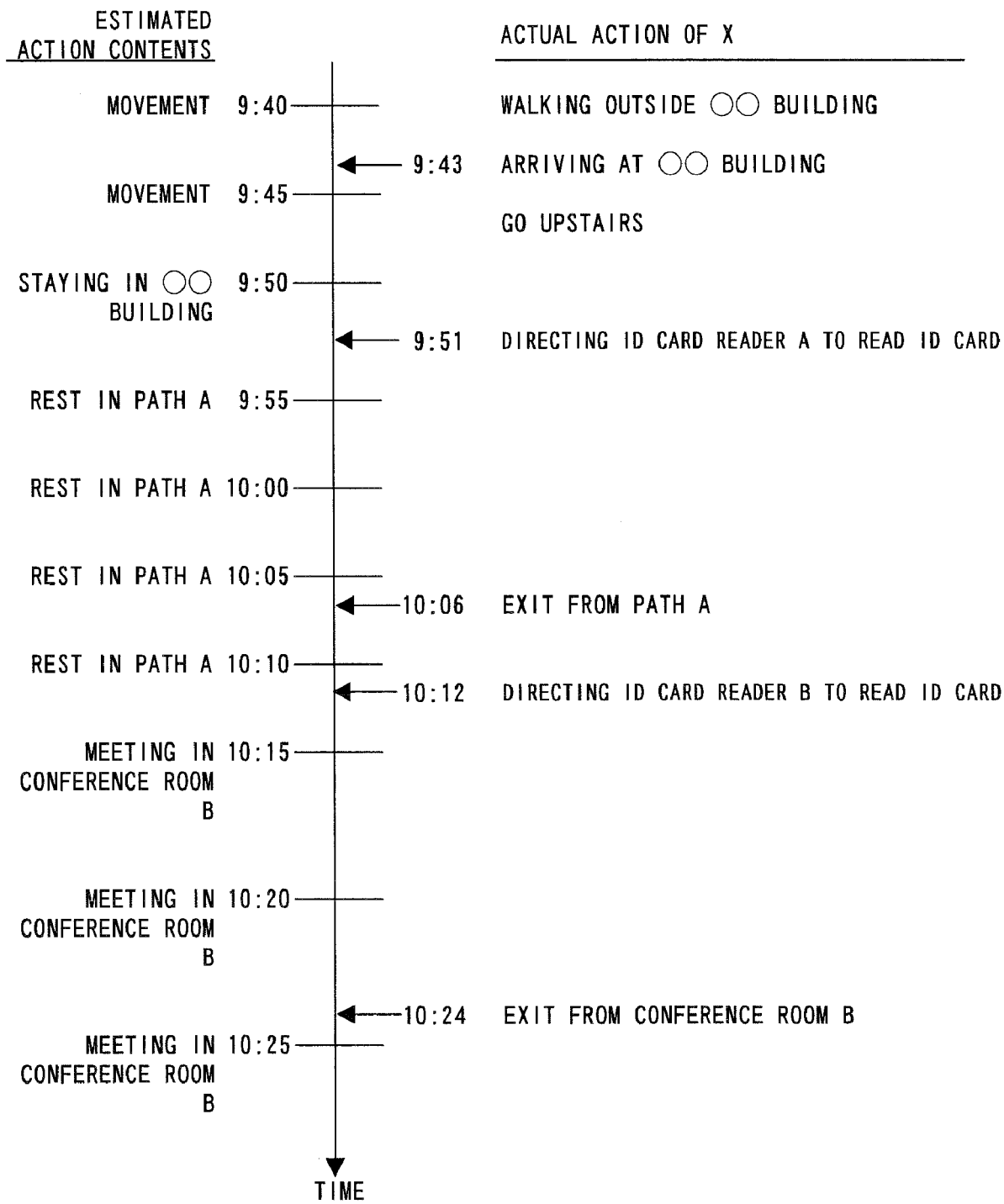
FIG. 12 is a time chart showing an example of offline action and an example of action contents estimated by a style of embodiment of the action record support system according to the present invention.

In the example shown in FIG. 12, the person-to-be-recorded X walks to the ○○ Building on Dec. 3, 2006, arrives at the ○○ Building at 9:43, goes upstairs, allows the ID card reader A mounted near the path A to read the ID card at 9:51, stays at the path A for some time, leaves the path A and goes to the conference room B at 10:06, allows the ID card reader B mounted at the entrance of the conference room B to read his/her ID card and enters the conference room B at 10:12, and exits the conference room B at 10:24. In this example, the position information acquisition interval is five minutes.

In the example shown in FIG. 12, when the server performs the process in step S208 after the process shown in FIG. 8 is called from step S106 at 9:50, it is not correct to detect the record assigned the date and time closest to the current time (9:50) simply using the person-to-be-recorded and the place Z (in this example, "○○ Building") as a key because, in this way, the first record shown in FIG. 11 and generated when Mr. X came to the ○○ Building on Nov. 30, 2006 matches the retrieval condition.

To avoid this, it is necessary to limit the retrieval range to the range of time of keeping staying in one building.

Therefore, in x that satisfies p(j)=p(N) for all j's where x≦j≦N, the minimum value of x is set to x_min. Then, in the range from t(x_min−1) to t(N), the ID card reader history information about the person-to-be-recorded recorded by the ID card reader in the place Z on the date and time closest to t(N) is retrieved in the ID card reader history information DB 206. By the retrieval, only the appropriate ID card reader history information can be acquired.

The reason why t(x_min−1) not t(t_min) is used is described below. In the example shown in FIG. 12, if the time at which the ID card reader A is allowed to read the ID card is 9:44 and the process in step S106 is performed at 9:50, then t(t_min) is 9:45. Therefore, when the range from t(x_min) to t (N) is searched, the record of reading the ID card by the ID card reader A at 9:44 cannot be acquired. To avoid the problem, the search range is changed from t(x_min−1) to t(N).

When the process in step S208 is performed at 9:50 on Dec. 3, 2006, t(x_min−1) is 9:40 on the day. The record of Mr. X allowing the ID card reader in the ○○ Building to read the ID card in the range from 9:40 to 9:50 on the day is not shown in FIG. 11. Therefore, the server determines that the ID card reader history information cannot be acquired in step S208, and control is passed to step S207.

In the example shown in FIG. 12, the t(x_min−1) is 9:40 on the day afterwards. Therefore, if the process in step S208 is performed at 9:55, 10:00, 10:05, and 10:10, then the second record shown in FIG. 11 and generated by Mr. X allowing the ID card reader A in the ○○ Building to read the ID card at 9:51 on the day matches the retrieval condition. The server stores the contents of the second record in the memory, etc., determines that the ID card reader history information has been acquired, and passes control to step S209.

Similarly, if the process in step S208 is performed at 10:15, 10:20, and 10:25, then the third record shown in FIG. 11 and generated by Mr. X allowing the ID card reader B in the ○○ Building to read the ID card at 10:12 on the day matches the retrieval condition. The server stores the contents of the third record in the memory, etc., determines that the ID card reader history information has been acquired, and passes control to step S209.

In step S209, the server retrieves the position-action correspondence DB 205 using the ID card reader history information stored in step S208.

FIG. 13 shows an example of the position-action correspondence for estimation of the action based on the place.

In this style of embodiment, the position-action correspondence is stored in a table form in the position-action correspondence DB 205. The position-action correspondence DB 205 is stored in the storage device that can be referred to by the server, and stores in advance the position-action correspondence by a system administrator, etc. FIG. 13 shows two columns "place" and "action". FIG. 13 shows, for example, the position-action correspondence for estimation that "the action content of a person at the path A is a rest", the position-action correspondence for estimation that "the action content of a person in the conference room B is a meeting." For example, the above-mentioned position-action correspondence can be recorded when there is a smoking room freely accessible without an ID card, it is necessary to pass the path A to enter the smoking room, and an ID card reader is mounted in the path A. The above-mentioned position-action correspondence is recorded also when a rest is frequently taken in the path A.

It is necessary that the "place" shown in FIG. 13 is recorded in the form corresponding to the "place" of the building information shown in FIG. 10 (for example, using the same identifier between FIGS. 10 and 13 as an identifier indicating the "conference room B"). The position-action correspondence is recorded in the position-action correspondence DB 205 by a system administrator in advance.

The position-action correspondence can be designed in various configurations depending on the aspect of embodiment. For example, any form other than a table form can be used. Although the table shown in FIG. 13 is constituted by two columns, a table of three columns can express the position-action correspondence depending on the system of the identifier used in the building information. For example, in the style of embodiment in which a system of an identifier allowing different rooms in different buildings to be expressed by the accidentally same identifiers is permitted, it is necessary to add a column indicating a building in the table shown in FIG. 13.

In step S209, if the action corresponding to the ID card reader history information stored in step S208 is estimated by the position-action correspondence as a result of retrieving the position-action correspondence DB 205, the server stores the contents of the action in the memory, etc., thereby terminating the process. For example, in the example shown in FIG. 12, when the process in step S208 is called at 9:55, the contents of the second record shown in FIG. 11 are acquired. Therefore, the server retrieves the position-action correspondence DB 205 using the path A as a place corresponding to the ID card reader A of the ○○ Building as a key in the next step S209, estimates the offline action of the person-to-be-recorded as "rest" from the position-action correspondence "the action contents of a person in the path A is a rest", and the obtained data is stored in the memory, etc.

In this style of embodiment, it is assumed that the position-action correspondence corresponding to the place is stored in advance for each of the "place" existing in the building information. In another style of embodiment where the assumption does not hold, there is a case in which the action corresponding to the ID card reader history information stored in step S208 cannot be estimated by the position-action correspondence as a result of retrieving the position-action correspondence DB 205. In this case, it is preferable that, for example, based on the ID card reader history information stored in step S208, the action is estimated as "staying in the path A of the ○○ Building", and the server stores it in the memory, etc.

As described above, when the estimated action contents is stored in step S209, the process terminates.

When the process shown in FIG. 8 terminates in steps S203, S205, S207, and S209, the process in step S106 shown in FIG. 4 terminates, and control is passed to step S107.

The present invention is not limited to the above-mentioned style of embodiments, but can be realized by adding various changes. The important variations are explained below.

In the example above, the cases in which the contents of offline action cannot be estimated are not described. However, for example, when a person-to-be-recorded forgets carrying a mobile telephone and an ID card, when the person-to-be-recorded travels around the place where radio waves cannot be easily transmitted, and when action schedule information is not recorded, there is the possibility that the contents of the offline action can not be estimated. However, in these cases, the start time ts and the stop time te of the offline action can be grasped in FIG. 4. Therefore, in step S111, the input screen with the default values only in the start time input field 301 and the stop time input field 302 is displayed.

In the example shown in FIG. 3, the action schedule information DB 202, the map information DB 203, the building information DB 204, the position-action correspondence DB 205, the ID card reader history information DB 206, and the action record DB 207 are stored in the storage device in the server 201. However, depending on the aspect of the embodiment, for example, these databases can be stored in the storage device in the file server aside from the server 201. If the server 201, the clients 209-1 and 209-2 can refer to or update the data, the data can be stored in any storage device.

In the description above, both action schedule information and position information (movement position information, immobile target position information, and position-action correspondence) are used as preferable styles of embodiments. However, depending on the style of embodiment, only the action schedule information can be used, or only the position information can be used. The flowchart when only the action schedule information is used is prepared by deleting the steps S104, S105, S106, and S110 from FIG. 4 and changing step S107 to a step in which only the presence/absence of the computer operation is monitored. The flowchart when only the position information is used is prepared by deleting steps S109 and S110 from FIG. 4.

In the above-mentioned style of embodiment, the movement position information, the map information, the building information, the ID card reader history information, the position-action correspondence are used as the position information. However, depending on the style of embodiment, only a part of these can be used.

For example, when a person-to-be-recorded rarely goes to a building provided with an ID card reader, the building information and the ID card reader history information may not be used. In this case, the place information can be associated with the position-action correspondence. That is, instead of using the "place" ("path A", etc.) of the building information (FIG. 10) as the "place" shown in FIG. 13, the "place" ("∘∘ Building", etc.) of the map information (FIG. 9) can be used as the "place" shown in FIG. 13. Then, after the place information ("∘∘ Building", etc.) is detected from the map information in step S204 shown in FIG. 8, the position-action correspondence DB 205 is searched based on the detected place information to estimate the action contents as in step S209.

Otherwise, for example, when the system according to the present invention is used to grasp the offline action of an employee almost always working in a specific building, only the building information, the ID card reader history information, and the position-action correspondence can be used as the position information. In this case, steps S105 and S106 can be deleted, and only the presence/absence of a computer operation may be monitored in step S107, and the action contents can be collectively estimated according to the position information between steps S108 and S109 or between steps S109 and S110. For example, for the example shown in FIG. 12, it can be estimated that a rest is taken in the path A from 9:51 to 10:11.

In the above-mentioned style of embodiment, the action contents respectively estimated in steps S203, S205, S207, and S209 are stored in the memory, etc. However, depending on the aspect of embodiment, if the estimation contents of the action from t(N−2) to t(N−1) estimated at t(N−1) match the estimation contents of the action from t(N−1) to t(N) estimated at t(N), then they can be merged as the estimation contents of the action from t(N−2) to t(N), and then be stored. The merge can be performed in steps S203, S205, S207, and S209, and can be performed in steps S110, S111, etc.

In the above-mentioned style of embodiment, each time the online action is detected, the client records the contents of the action in the action record DB 207 in step S115. However, depending on the aspect of the embodiment, while similar online action is continuously detected, the client locally records the online action, and the contents can be recorded later in the action record DB 207. For example, the person-to-be-recorded continues browsing the Web using a browser from 10:00 to 10:30. When the operation for the browser is detected 15 times in 30 minutes, recording in the action record DB 207 may not be performed 15 times, but can be collectively performed once. In this case, it is preferable that the recording timing is the point when another kind of online action is detected later than 10:30, or when a computer operation is not detected for or more than an offline determination threshold.

In the above-mentioned style of embodiment, while a person-to-be-recorded is performing offline action, movement position information is acquired and the action contents are estimated (steps S105, S106, S107 shown in FIG. 4, and FIG. 8) at position information acquisition intervals (for example, every five minutes). However, in another style of embodiment, while a person-to-be-recorded is performing offline action, movement position information is acquired only, and afterwards, the action contents can be estimated at a time. That is, in step S106, the movement position information is acquired (step S201) only, and the estimation of the action contents (from step S202 to step S209) can be collectively performed between steps S108 and S109 or between steps S109 and S110.

In the above-mentioned style of embodiment, to acquire movement position information p(N) from a person-to-be-recorded, the server transmits a send request for movement position information to a mobile telephone, and the mobile telephone returns the position information to the server. However, depending on the aspect of embodiment, the mobile telephone can voluntarily transmit the movement position information p(N) to the server at position information acquisition intervals.

The present invention can be embodied as a client-server system as described above, and also as a standalone system. When it is embodied as a standalone system, the operation shared by the server and the client according to the above-mentioned explanation is performed by one computer. However, the flow of the process is similar to that shown in FIGS. 4 and 8. The standalone program according to the present invention directs one computer to operate as described above.

When the present invention is embodied as a client-server system, depending on the aspect of embodiment, the range shared by the client and the server can be different from that in the above-mentioned style of embodiment. That is, the range of the function realized by the client program and the server program can be combined in various manners depending on the aspect of embodiment as shown in the following example.

The server recognizes the occurrence of offline action because the client can notify the server of the occurrence of offline action in step S102 as above-mentioned style of embodiment, or because the server can ask the client at a certain interval (for example, an offline determination threshold), and the client returns the presence/absence of the occurrence of offline action to the server.

The action record DB 207 stores the offline action in step S114 and online action in step S115. In each step, the client can record the action, or the client can transmit data to the server, and the server records the received data.

The processes in steps S111 through S113 (the steps of displaying the input screen and accepting the input of the person-to-be-recorded as shown in FIG. 6) are performed by the client in any style of embodiment.

When the present invention is realized as a client-server system, action record support can be performed on a plurality of persons-to-be-recorded. In this case, it is necessary for the server to manage the identifier for identification of the persons-to-be-recorded. The identifier can be a login name used when a client is used, an IP address of the client, or a unique identifier of the action record support system of the present invention.

When the server manages the identifier of a person-to-be-recorded, and a person-to-be-recorded uses two or more clients, the process required to record offline action by the person-to-be-recorded depends on the aspect of embodiment.

For example, explanation is given below using the example in which it is assumed that the offline determination threshold is 10 minutes, the person-to-be-recorded 213-1 performs the online action using the client 209-1 from 10:00 to 10:30, performs the online action using the client 209-2 from 10:30 to 11:00, and the online action using the client 209-1 is resumed from 11:00.

When the system of the present invention is embodied based on the precondition that the server uses the IP address of the client to identify the person-to-be-recorded and the IP address uniquely corresponds to the person-to-be-recorded, the server considers that the clients 209-1 and 209-2 correspond to different persons-to-be-recorded. Therefore, the client 209-2 considers that the period from 10:00 to 10:30 is an offline action period and the client 209-1 considers that the period from 10:30 to 11:00 is an offline action period. As a result, when the person-to-be-recorded 213-1 resumes the operation using the client 209-1 at 11:00, it is prompted to input about the offline action for 30 minutes from 10:30 although the person-to-be-recorded 213-1 actually performs the online action using the client 209-2.

On the other hand, when the server assumes that one person-to-be-recorded uses a plurality of clients, and uses the identifier for determination of the same person-to-be-recorded regardless of which client among the plurality of clients is used to perform an operation, the person-to-be-recorded 213-1 can be free of the above-mentioned troublesome consideration. In a style of embodiment, when the client 209-1 notifies the server of the occurrence of offline action, the server issues an inquiry for confirmation to another client whether or not the person-to-be-recorded 213-1 is performing online action using the other client. If the person-to-be-recorded 213-1 is performing online action with any of the clients (the client 209-2 in the example above), the server does not recognize it as the occurrence of offline action. In other methods, it is possible to allow the server to recognize that the online action continues from 10:00.

Figure 14:
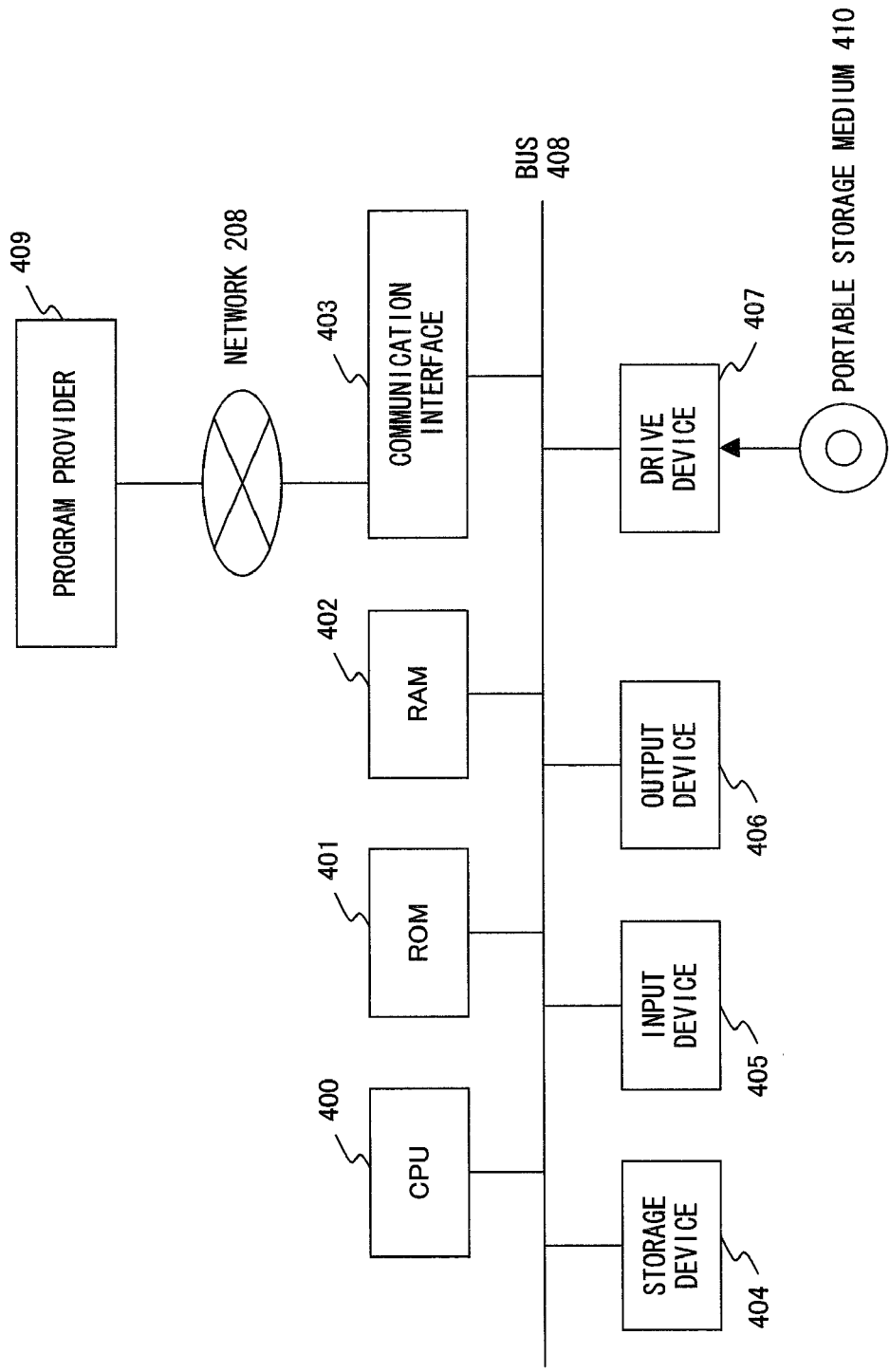
FIG. 14 is a block diagram of a computer executing a program according to the present invention.

The program according to the present invention is executed by a common information processing device (computer) as shown in FIG. 14. When the present invention is embodied as a client-server system, both the client and the server are information processing device as shown in FIG. 14. When the present invention is embodied as a standalone system, the program according to the present invention is executed by the information processing device as shown in FIG. 14.

The information processing device shown in FIG. 14 comprises a CPU (central processing unit) 400, ROM (read only memory) 401, RAM (random access memory) 402, a communication interface 403, a storage device 404, an input device 405, an output device 406, and a drive device 407 of a portable storage medium. All these components are connected via a bus 408.

The movement position information transmitted from a mobile telephone carried by a person-to-be-recorded and an ID card reader is received over the network 208 through the communication interface 403. The network 208 is similar to that shown in FIG. 3.

When the present invention is embodied as a client-server system, the client and the server can communicate with each other through the communication interface 403 and the network 208. For example, a notification from the client to the server in steps S102 and S107, and the data transmission from the server to the client in step S110 can be realized by the communication.

The storage device 404 can be a storage device in various forms including a magnetic disk such as a hard disk, etc. The storage device 404 or the ROM 401 stores a program, etc. according to the present invention. The present invention is realized by the CPU 400 executing the program. The action record DB 207, the action schedule information DB 202, the map information DB 203, the building information DB 204, the position-action correspondence DB 205, the ID card reader history information DB 206, etc. are stored in the storage device 404, read to the RAM 402 and processed by the CPU 400.

The input device 405 is a pointing device such as a mouse, a touch pad, etc. and a keyboard. The output device 406 is a display device such as a liquid crystal display, etc. The output device 406 displays an input screen as shown in FIG. 6. A person such as a person-to-be-recorded, etc. inputs an amendment to the estimated contents or approves the displayed contents through the input device 405 while watching the input screen. The input from the input device 405 is detected as the occurrence of online action.

The program according to the present invention is provided from a program provider 409 through the network 208 and the communication interface 403, stored in the storage device 404, etc., and can be executed by the CPU 400. The marketed and distributed portable storage medium 410 can store a program according to the present invention, and can be set to the drive device 407, the stored program is loaded into, for example, the RAM 402, and can be executed by the CPU 400. The portable storage medium 410 can be any of various storage media including an optical disk such as a CD (compact disc), a DVD (digital versatile disk), etc., a magneto optical disk, a flexible disk, etc.

Similarly, the map information DB 203, the building information DB 204, the position-action correspondence DB 205, etc. can be stored in the storage device 404 after provided from the program provider 409 through the network 208 and the communication interface 403, or stored in the portable storage medium 410 and read through the drive device 407, and stored in the storage device 404 or loaded into the RAM 402.

What is claimed is:

1. A computer-readable storage medium which is used in an action record support computer for supporting a record of action, and stores an action record support program used to direct the computer to perform the steps, comprising:
an offline action occurrence recognizing step of recognizing, when online action does not occur for or longer than a predetermined time, an occurrence of offline action which is performed by a person-to-be-recorded whose action is to be recorded and is action other than the online action which is performed by the person-to-be-recorded and performed with a computer operation;
an action related information acquiring step of acquiring action related information associated with the offline action of the person-to-be-recorded;
an offline action estimating step of estimating a content of the offline action of the person-to-be-recorded according to the acquired action related information; and
an offline action content input step of accepting input data relating to the content of the estimated offline action.

2. The storage medium according to claim 1, wherein the action related information comprises action schedule information recorded in advance as associated with the person-to-be-recorded.

3. The storage medium according to claim 1, wherein the action related information comprises movement position information indicating a position of the person-to-be-recorded and transmitted from a position information transmission device to the action record support computer, and immobile target position information indicating a position of an immobile target and recorded in advance.

4. The storage medium according to claim 3, wherein the position information transmission device is carried by the person-to-be-recorded.

5. The storage medium according to claim 3, wherein the movement position information is generated by the position information transmission device reading information about the person-to-be-recorded stored in a person-to-be-recorded identification device carried by the person-to-be-recorded.

6. The storage medium according to claim 3, wherein the action related information further comprises action estimation correspondence recorded in advance and associating the immobile target position information with a content of offline action.

7. The storage medium according to claim 1, wherein the action record support program further directs the action record support computer to perform an online action recording step of recording a content of the online action when an occurrence of the online action is detected.

8. The storage medium according to claim 7, wherein the action record support program further directs the action record support computer to perform an offline action recording step of recording the data accepted in the offline action content input step in a recording form compatible with a recording form of the content of the online action.

9. The storage medium according to claim 1, wherein an occurrence of the offline action is recognized in the offline action occurrence recognizing step by accepting a notification transmitted by monitoring an occurrence of the online action of the person-to-be-recorded.

10. An action record support device for supporting a record of action, comprising:
an offline action occurrence recognition unit recognizing, when online action does not occur for or longer than a predetermined time, an occurrence of offline action which is performed by a person-to-be-recorded whose action is to be recorded and is action other than online action which is performed by the person-to-be-recorded and performed with a computer operation;
an action related information acquisition unit acquiring action related information associated with the offline action of the person-to-be-recorded;
an offline action estimation unit estimating a content of the offline action of the person-to-be-recorded according to the acquired action related information; and
an offline action content input unit accepting input data relating to the content of the estimated offline action.

11. A method used by an action record support computer for supporting a record of action, comprising:
recognizing, when online action does not occur for or longer than a predetermined time, an occurrence of offline action which is performed by a person-to-be-recorded whose action is to be recorded and is action other than online action which is performed by the person-to-be-recorded and performed with a computer operation;
acquiring action related information associated with the offline action of the person-to-be-recorded;
estimating a content of the offline action of the person-to-be-recorded according to the acquired action related information; and
accepting input data relating to the content of the estimated offline action.

12. An action record support system for supporting a record of action comprising an action record support computer and one or more client computers, wherein:
the client computer monitors an occurrence of online action which is action with an operation of the client computer performed by a person-to-be-recorded whose action is to be recorded;
when the online action does not occur for or longer than a predetermined time, the client computer notifies the action record support computer of an occurrence of the offline action;
at the notification, the action record support computer recognizes the occurrence of the offline action;
the action record support computer acquires action related information relating to the offline action of the person-to-be-recorded;
according to the acquired action related information, the action record support computer estimates a content of the offline action of the person-to-be-recorded;
the action record support computer transmits the content of the estimated offline action to the client computer;
the client computer displays the received content of the offline action on a display device; and
the action record support computer accepts input data relating to the displayed content of the offline action through the client computer.

* * * * *